(12) United States Patent
Flynn

(10) Patent No.: US 10,221,873 B2
(45) Date of Patent: Mar. 5, 2019

(54) PIN AND GROMMET FASTENER ASSEMBLY

(71) Applicant: ILLINOIS TOOL WORKS INC., Glenview, IL (US)

(72) Inventor: Gregory S. Flynn, Lake Orion, MI (US)

(73) Assignee: Illinois Tool Works Inc., Glenview, IL (US)

(*) Notice: Subject to any disclaimer, the term of this patent is extended or adjusted under 35 U.S.C. 154(b) by 147 days.

(21) Appl. No.: 15/503,064

(22) PCT Filed: Jun. 13, 2015

(86) PCT No.: PCT/US2015/035712
§ 371 (c)(1),
(2) Date: Feb. 10, 2017

(87) PCT Pub. No.: WO2016/028369
PCT Pub. Date: Feb. 25, 2016

(65) Prior Publication Data
US 2017/0234343 A1 Aug. 17, 2017

Related U.S. Application Data

(60) Provisional application No. 62/038,450, filed on Aug. 18, 2014.

(51) Int. Cl.
*F16B 13/06* (2006.01)
*F16B 5/06* (2006.01)

(52) U.S. Cl.
CPC .................. *F16B 5/0628* (2013.01)

(58) Field of Classification Search
CPC ......... F16B 21/08; F16B 21/075; F16B 21/06

USPC ..................................................... 411/45, 41
See application file for complete search history.

(56) References Cited

U.S. PATENT DOCUMENTS

| | | | | |
|---|---|---|---|---|
| 4,952,106 A | * | 8/1990 | Kubogochi | F16B 19/1081 411/48 |
| 5,211,519 A | * | 5/1993 | Saito | F16B 19/1081 411/45 |
| 5,370,484 A | * | 12/1994 | Morikawa | F16B 19/1081 411/41 |
| 5,375,954 A | * | 12/1994 | Eguchi | F16B 19/1081 411/41 |
| 6,039,523 A | * | 3/2000 | Kraus | F16B 5/0628 411/48 |

(Continued)

FOREIGN PATENT DOCUMENTS

| | | |
|---|---|---|
| EP | 0921323 A2 | 6/1999 |
| WO | 0230710 A1 | 4/2002 |

OTHER PUBLICATIONS

ISR & WO for PCT/US2015/035712 dated Aug. 25, 2015.

*Primary Examiner* — Gary W Estremsky
(74) *Attorney, Agent, or Firm* — Joseph M. Butscher; The Small Patent Law Group, LLC

(57) ABSTRACT

A fastener assembly may include a pin including a central shaft connected to a distal tip, and a grommet including at least one leg. The pin and the grommet are configured to be positioned in an expanded state in which the fastener assembly securely fastens to the component, and a retracted state in which the leg(s) is drawn toward the central shaft to reduce an axial envelope of the leg(s).

19 Claims, 7 Drawing Sheets

(56) References Cited

U.S. PATENT DOCUMENTS

| | | | | |
|---|---|---|---|---|
| 6,196,756 B1* | 3/2001 | Leverger | ................ | B60J 3/023 |
| | | | | 403/326 |
| 6,364,586 B1* | 4/2002 | Okada | ................ | F16B 19/1081 |
| | | | | 411/41 |
| 7,677,850 B2* | 3/2010 | Sano | ................ | F16B 19/1081 |
| | | | | 16/2.1 |
| 7,736,107 B2* | 6/2010 | Okada | ................ | F16B 19/1081 |
| | | | | 411/41 |
| 8,794,887 B2* | 8/2014 | Nishino | ............. | F16B 19/1081 |
| | | | | 24/295 |
| 2005/0019130 A1* | 1/2005 | Kanie | ................ | F16B 19/1081 |
| | | | | 411/45 |
| 2007/0172327 A1* | 7/2007 | Hansen | .............. | F16B 19/1081 |
| | | | | 411/41 |
| 2013/0136559 A1* | 5/2013 | Hauser | ................ | F16B 5/065 |
| | | | | 411/45 |

* cited by examiner

US 10,221,873 B2

PIN AND GROMMET FASTENER ASSEMBLY

RELATED APPLICATIONS

This application is a national phase of International Application Number PCT/US2015/035712 filed Jun. 13, 2015 and relates to and claims priority benefits from U.S. Provisional Patent Application No. 62/038,450 filed Aug. 18, 2014, which is hereby incorporated by reference in its entirety.

FIELD OF EMBODIMENTS OF THE DISCLOSURE

Embodiments of the present disclosure generally relate to a fastener assembly, and more particularly to a pin and grommet fastener assembly.

BACKGROUND

Fasteners are used to secure various components together. For example, a fastener may be used to securely connect a first panel to a second panel. Cover panels, such as B-pillar appliqués, may be secured to door frames or panels of automobiles through one or more fasteners.

In order to secure the first panel to the second panel, a pin and grommet fastener may be used. The fastener may include a pin secured within a grommet. A top, planar portion of the pin may be adhesively secured to the first panel, while the grommet is snapably secured within a hole formed in the second panel. Typically, the grommet includes a passage that allows the pin to pass through during a mating process. The passage typically conforms to the shape of the pin shaft when the pin is secured with respect to the grommet.

Known pin and grommet fastener assemblies include grommet legs that spread and set after being installed into a panel for an extended period of time. When such a known pin and grommet fastener assembly is removed from a hole of the panel, the grommet legs remain set in an openly spread position. That is, the outward bias of the grommet legs may cause them to permanently set in an outwardly-biased state. The distance between the outwardly-biased legs may be wider than a hole within a panel. As such, the fastener assembly may not be easily re-inserted into a hole of a panel, as the spread grommet legs may snag onto edge portions of the panel that surround the hole.

Accordingly, a need exists for a grommet that may be efficiently and easily inserted and reinserted into holes of panels.

SUMMARY OF EMBODIMENTS OF THE DISCLOSURE

Certain embodiments of the present disclosure provide a fastener assembly that is configured to be secured to a component. The fastener assembly may include a pin including a central shaft connected to a distal tip, and a grommet including at least one leg. The pin and the grommet are configured to be positioned in an expanded state in which the fastener assembly securely fastens to the component, and a retracted state in which the leg(s) is drawn toward the central shaft to reduce an axial envelope of the leg(s).

At least a portion of the central shaft may be driven and/or positioned through a pin passage of the grommet in the expanded state and the retracted state. The pin and the grommet may also be positioned in a pre-installed state in which the central shaft is outside of the pin passage.

In at least one embodiment, the pin may include at least one retaining ramp that is configured to inwardly draw and retain the leg(s) toward the central shaft in the retracted state. The retaining ramp(s) may trap the leg(s) in the retracted state. The retaining ramp(s) may include an angled surface that slopes from an outer surface of the central shaft toward a central longitudinal axis of the pin. A channel may be formed within the central shaft over the angled surface. The channel provides space for at least a portion of the leg(s) to be retained in the retracted state.

In at least one embodiment, the pin may include at least one flex member (such as an arm, wing, beam, tab, and/or the like) that is configured to stabilize the fastener assembly within a hole of the component in the expanded state. The flex member(s) may include a flexible root connected to the central shaft and a free end extending outwardly from the flexible stem at an angle.

The grommet may include a flange surrounding a pin passage. The leg(s) may extend from the flange. The leg(s) may include an inwardly-canted distal end.

Figure 1:
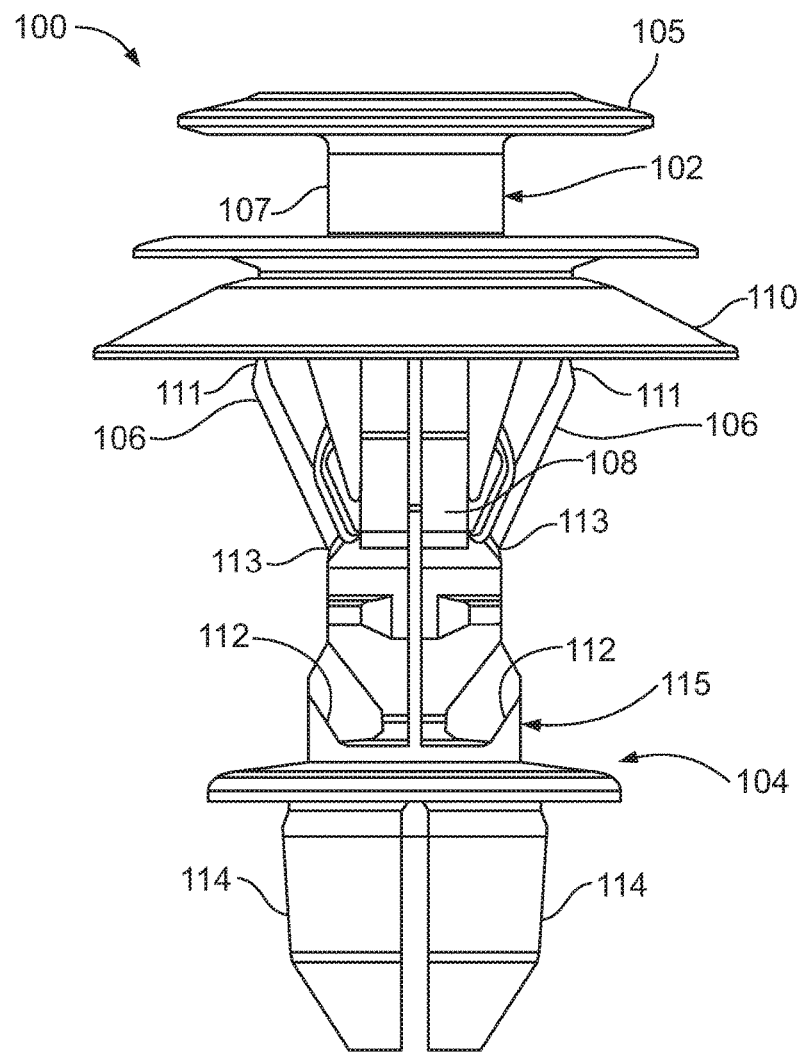
FIG. 1 illustrates a front view of a fastener assembly, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide a pin and grommet fastener assembly that may include a pin having one or more ramps that are configured to inwardly draw and secure (such as by tucking, pulling, or otherwise retaining) grommet legs as the fastener assembly is removed from a component, such as a panel. By inwardly securing the grommet legs, embodiments of the present disclosure prevent or otherwise reduce the possibility of the grommet legs setting in an outwardly spread position, thereby allowing the fastener assembly to be easily re-inserted into an opening or hole of a component.

In at least one embodiment, the pin and grommet fastener assembly may also include one or more flex members (such as arms, tabs, wings, beams, posts, or the like) that may be configured to cooperate with the ramp(s) to inwardly secure the grommet legs as the fastener assembly is removed from a component, such as a panel. Optionally, the fastener assembly may not include the flex member(s).

FIG. 1 illustrates a front view of a fastener assembly 100, according to an embodiment of the present disclosure. The fastener assembly 100 may include a pin 102 and a grommet 104.

The pin 102 may include opposed flex members 106, such as arms or wings, positioned about a central shaft or beam 108. As shown, each flex member 106 may outwardly angle from a lower portion of the central shaft or beam 108 up toward a collar 110, which may be separated from a cap 105 by a reduced-diameter neck 107. The pin 102 may be configured to securely trap a portion of a panel between the cap 105 and the collar 110 such that edges that define a hole through the panel may secure around the neck 107.

Upper ends 111 of each flex member 106 may be free (for example, not attached to the collar 110), while lower roots 113 of the flex members 106 are flexibly anchored to the central shaft 108. As such, the roots 113 provide pivot areas that allow the flex members 106 to flex toward and away from the central shaft 108. Optionally, the pin 102 may not include the flex members 106.

A grommet-engaging end 115 of the central shaft 108 may include one or more guide or retaining ramps 112, which may be formed on or in the central shaft 108. For example, channels that define the retaining ramps 112 may be formed through outer surface of the central shaft 108 and into internal portions of the central shaft 108. The grommet-engaging end 115 may be distally located from the collar 110 and may be at a lower end (as shown in FIG. 1) of the pin 102. The flex members 106 and the retaining ramps 112 may cooperate to return the grommet legs 114 (such as four grommet legs 114, for example) to retracted positions after the fastener assembly 100 has been removed from a component, such as a panel. The retaining ramps 112 may act to inwardly secure the grommet legs 114 to the central shaft 108 of the pin 102. For example, the retaining ramps 112 may act to move the grommet legs 114 towards the center of the fastener assembly 100, as described below.

As shown in FIG. 1, the pin 102 and the grommet 104 are in a pre-installed state. In the pre-installed state, the central shaft 108 of the pin 102 may be outside of a pin passage of the grommet 104 (a distal tip of the pin 102 may be at least partially within the pin passage). The pin 102 may be suspended in relation to the grommet 104 through a thin layer of material, such as a flashing that may be formed during a forming process. The fastener assembly 100 may be shipped to an end user in the pre-installed state.

In order to operate the fastener assembly 100, the pin 102 is driven downwardly into the grommet 104, thereby breaking the suspending connection between the pin 102 and the grommet 104, and allowing the pin 102 to be selectively moved into and out of the pin passage of the grommet 104. The fastener assembly 100 may be moved into an expanded state, in which the pin 102 may be fully driven into the pin passage, thereby forcing the legs 114 into an outwardly-biased position that securely fastens the fastener assembly 100 to a component. As described below, the fastener assembly 100 may also be moved into a retracted position (such as when the fastener assembly 100 is removed from the component), in which one or more portions of the pin 102 inwardly draw (for example, retract) the legs 114 of the grommet 104 so as to reduce the axial envelope of the legs 114.

Figure 2:
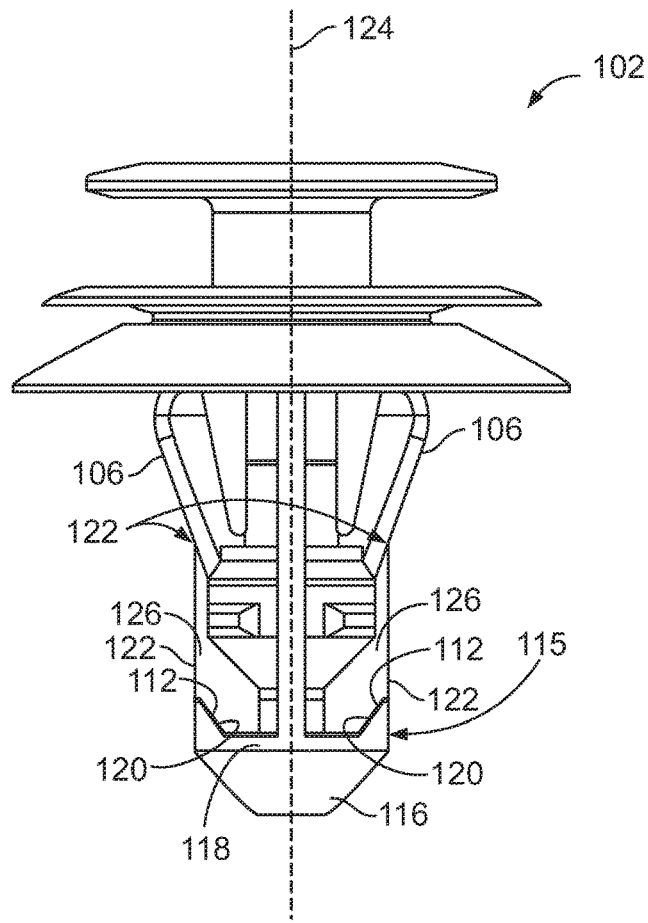
FIG. 2 illustrates a front view of a pin, according to an embodiment of the present disclosure.

FIG. 2 illustrates a front view of the pin 102, according to an embodiment of the present disclosure. The pin 102 may include a beveled lead-in tip 116 below the retaining ramps 112. A circumferential ledge 118 may annularly extend around the central shaft 108 above the lead-in tip 116. For example, the tip 116 may extend downwardly from the ledge 118.

Each retaining ramp 112 may include an angled surface 120 that downwardly slopes from an outer lateral portion 122 of the central shaft 108 toward a central longitudinal axis 124 of the pin 102. As shown, the angled surfaces 120 may be parallel or substantially parallel to a bevel angle of the tip 116. Optionally, the angle may be greater or less than shown. The angled surfaces 120 may provide reciprocal channels that conform to an outer shape of distal ends 134 of the legs 114. In at least one embodiment, the distal ends 134 of the legs 114 may be configured to nest within the channels formed by the angled surfaces 120.

A channel 126 may be formed above or otherwise be defined by each of the retaining ramps 112. The channels 126 provide space for portions of the grommet legs 114 (shown in FIG. 1, for example) to pass and be retained.

The pin 102 may include any number of retaining ramps 112. For example, the number of retaining ramps 112 may equal the number of grommet legs 114 of the grommet 104 (shown in FIG. 1). Alternatively, the pin 102 may include more or less retaining ramps 112 than shown.

Figure 3:
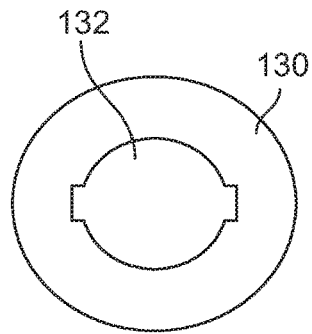
FIG. 3 illustrates a top view of a grommet, according to an embodiment of the present disclosure.

FIG. 3 illustrates a top view of the grommet 104, according to an embodiment of the present disclosure. As shown, the grommet 104 may include a circumferential flange 130 that surrounds a pin passage 132. The pin passage 132 is configured to receive the tip 116 of the pin 102, which may be driven into and through the pin passage 132

Figure 4:
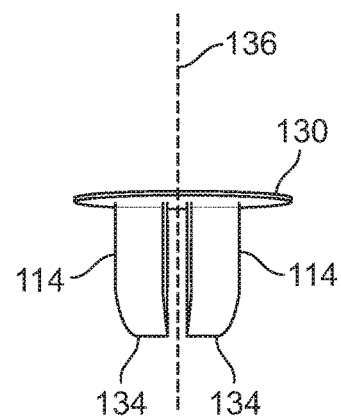
FIG. 4 illustrates a front view of a grommet, according to an embodiment of the present disclosure.

FIG. 4 illustrates a front view of the grommet 104, according to an embodiment of the present disclosure. Referring to FIGS. 3 and 4, the legs 114 downwardly extend from a lower surface of the flange 130 about the pin passage 132. Each leg 114 includes an inwardly canted distal end 134 that inwardly angles toward a central axis 136 of the grommet 104. The distal ends 134 are configured to be inwardly and securely retained by the retaining ramps 112 of the pin 102 in a retracted position when the fastener assembly 100 (shown in FIG. 1) is removed from a component.

Figure 5:
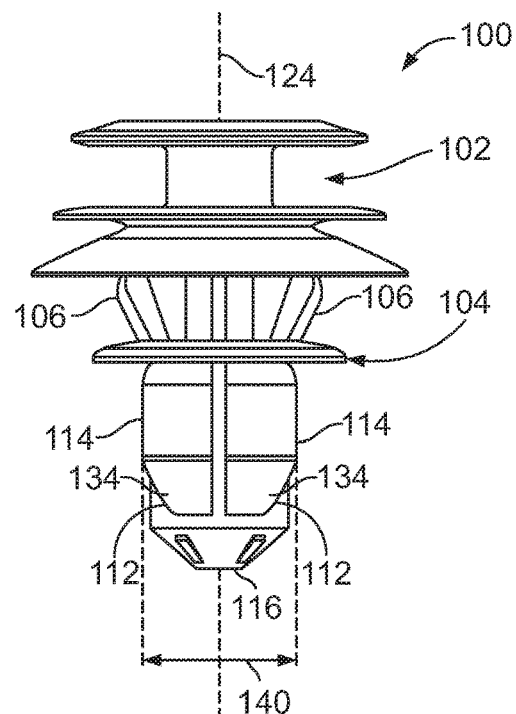
FIG. 5 illustrates a front view of a fastener assembly in a retracted position, according to an embodiment of the present disclosure.

FIG. 5 illustrates a front view of the fastener assembly 100 in a retracted position (for example, the grommet legs 114 are in a retracted position), according to an embodiment of the present disclosure. In the retracted position, the distal ends 134 of the grommet legs 114 are drawn inwardly by the retaining ramps 112 of the pin 102, thereby inwardly retracting the grommet legs 114 toward the central longitudinal axis 124 of the pin 102. As such, the grommet legs 114 are tucked, pulled, or otherwise inwardly drawn to minimize or otherwise reduce an outer envelope 140 of the grommet legs 114. In the retracted position, the outer envelope 140 of the inwardly drawn grommet legs 114 may be less than a diameter of a hole of a panel into which the fastener assembly 100 is to be positioned.

Figure 6:
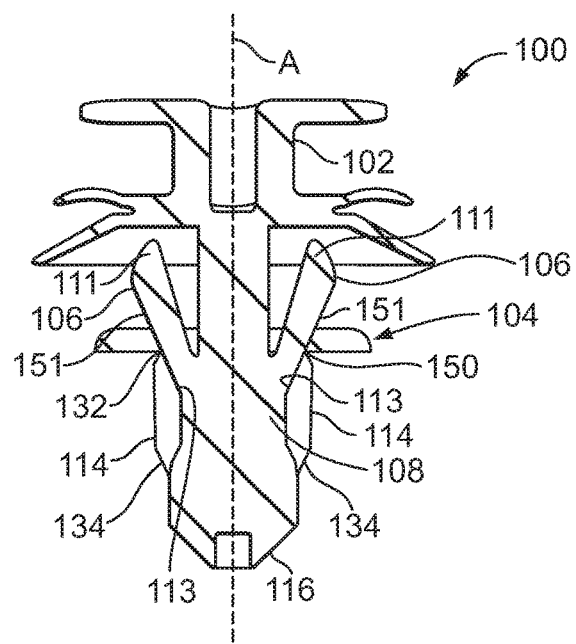
FIG. 6 illustrates an axial cross-sectional view of a fastener assembly in a retracted position, according to an embodiment of the present disclosure.

FIG. 6 illustrates an axial cross-sectional view of the fastener assembly 100 in a retracted position, according to an embodiment of the present disclosure. As shown in FIG. 6, outer surfaces 151 of the flex members 106 may directly contact an inner edge 150 of the grommet 104 that defines the pin passage 132. The outwardly-flared angles (from root 113 to free end 111) of the opposed flex members 106 may force the grommet 104 downward in the direction of arrow A, such that distal ends 134 of the grommet legs 114 are urged toward and into the guide ramps 112 (shown in FIGS. 1 and 2) of the pin 102. As noted above, in at least one other embodiment, the fastener assembly 100 may not include the flex members 106.

Figure 7:
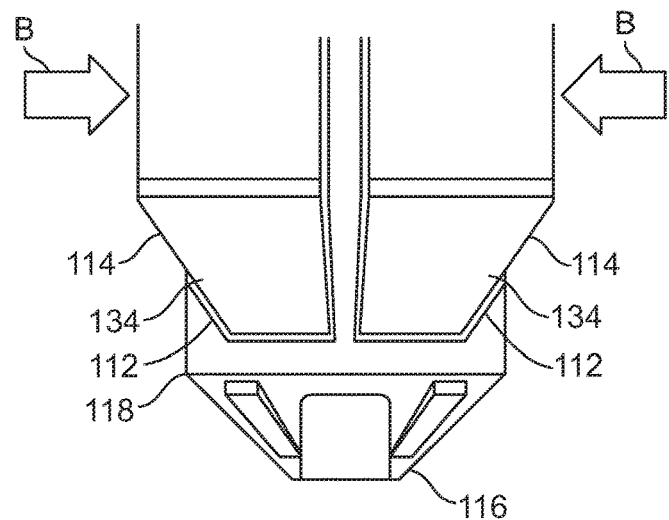
FIG. 7 illustrates a front view of grommet legs retained by retaining ramps of a pin, according to an embodiment of the present disclosure.
Figure 8:
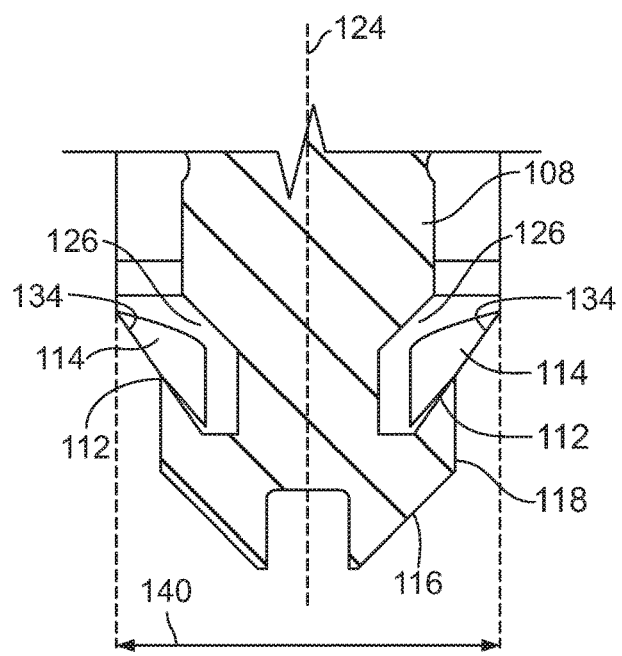
FIG. 8 illustrates an axial cross-sectional view of grommet legs retained by retaining ramps of a pin, according to an embodiment of the present disclosure.

FIG. 7 illustrates a front view of the grommet legs 114 retained by the retaining ramps 112 of the pin 102, according to an embodiment of the present disclosure. FIG. 8 illustrates an axial cross-sectional view of the grommet legs 114 retained by the retaining ramps 112 of the pin 102. Referring to FIGS. 7 and 8, the retaining ramps 112 receive the distal ends 134 of the grommet legs 114 and direct them inwardly toward the central longitudinal axis 124 of the pin 102. During removal from a hole of a panel, the interior edge of the panel that defines the hole may ensure that the grommet legs 114 are inwardly squeezed in the direction of arrows B, so that the distal ends 134 of the grommet legs 114 are directed into the retaining ramps 112.

In the retracted position, as shown in FIGS. 7 and 8, the angle of each retaining ramp 112 traps a respective distal end 134 within a channel 126. For example, the outer surface of each distal end 134 may conform to the angle of a respective retaining ramp 112. The retaining ramps 112 exert a retaining force into the distal ends 134 that inwardly directs the distal ends 134 toward the central longitudinal axis 124. For example, the distal ends 134 may be wedged into the channels 126 by the retaining ramps 112. Because the retaining ramps 112 inwardly draw and secure the distal ends 134 of the legs 114 toward the central longitudinal axis 124 of the pin 102, the axial envelope 140 of the retaining legs 114 is minimized or otherwise reduced.

As shown in FIGS. 5-8, the fastener assembly 100 may be in a retracted position in which the distal ends 134 of the grommet legs 114 are inwardly drawn and secured by the retaining ramps 112 in order to minimize or otherwise reduce the axial envelope 140 of the grommet legs 114. In this manner, the fastener assembly 100 may be quickly and easily secured into a hole of a component, such as a panel, as the reduced axial envelope of the grommet legs 114 may be less than a diameter of the hole. In order to secure the fastener assembly 100 into the hole, the pin 102 may be driven through the pin passage 132 of the grommet 104, thereby disengaging the grommet legs 114 from the retaining ramps 112 and spreading the grommet legs 114 open so that the axial envelope is greater than the diameter of the hole, as explained below.

Figure 9:
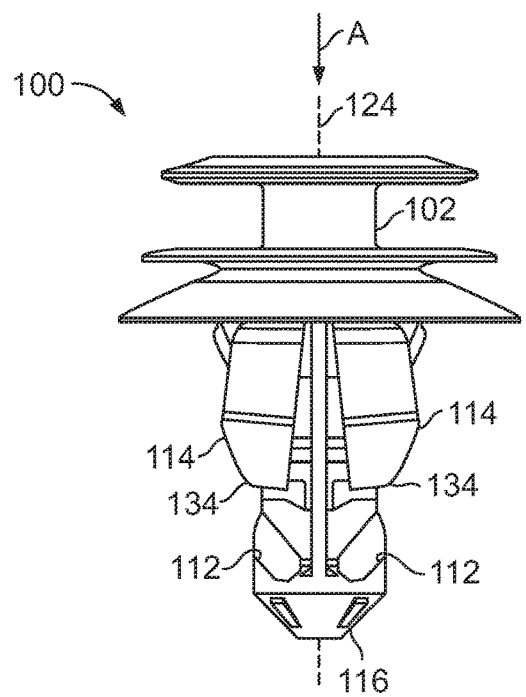
FIG. 9 illustrates a front view of a fastener assembly in an expanded state, according to an embodiment of the present disclosure.
Figure 10:
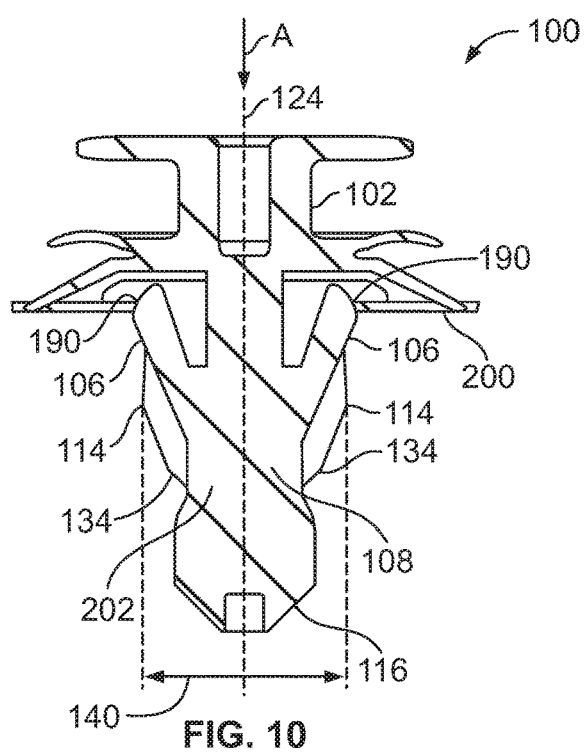
FIG. 10 illustrates an axial cross-sectional view of a fastener assembly in an expanded state, according to an embodiment of the present disclosure.

FIG. 9 illustrates a front view of the fastener assembly 100 in an expanded state, according to an embodiment of the present disclosure. FIG. 10 illustrates an axial cross-sectional view of the fastener assembly 100 in the expanded state. Referring to FIGS. 9 and 10, the expanded state represents a fully-installed state in which the fastener assembly 100 may be securely fixed to a component, such as within a hole of a panel, for example.

As shown, the flex members 106 may abut into internal edges 190 that define a hole formed through a panel 200 to which the fastener assembly 10 secures, thereby stabilizing the fastener assembly 100 with respect to the panel 200. The grommet legs 114 may also abut into the internal edges 190, thereby stabilizing the fastener assembly 100 in position.

As the pin 102 is driven through the grommet 104 into the expanded state, the tip 116 moves downwardly with respect to the grommet 104 in the direction of arrow A. For example, as the grommet 104 is held in position, the pin 102 may be linearly driven therethrough in the direction of arrow A. As the tip 116 moves downwardly with respect to the grommet 104, the distal ends 134 of the legs 114 disengage from the retaining ramps 112. As the pin 102 continues to be driven downwardly in the direction of arrow A, interior surfaces of the distal ends 134 slide over expanded portions 202 of the central shaft 108, thereby spreading the legs 114 open into an expanded position in which the axial envelope 140' of the legs 114 is greater than a diameter of the hole of the panel 200, thereby locking the fastener assembly 100 in place with respect to the panel 200.

Referring to FIGS. 1-10, as the fastener assembly 100 is removed from the panel 200, the force exerted by the resilient flex members 106 into the grommet 104 may force the grommet 104 down toward the nose 116 of the pin 102. During this movement, the distal ends 134 of the grommet legs 114 are urged into the guide ramps 112, which capture or otherwise retain the grommet legs 114 in the retracted position, as described above. During removal of the fastener assembly 100 from the panel 200, the flex members 106 may force the grommet 104 down toward the nose 116 of the pin 102, while the guide ramps 112 inwardly draw the grommet legs 114 toward the central longitudinal axis 124 of the pin 102. In this manner, in the retracted position, the axial envelope of the grommet legs 114 is reduced, and the grommet legs 114 are less susceptible to setting in an expanded position. As noted above, in at least one other embodiment, the fastener assembly 100 may not include the flex members 106.

Figure 11:
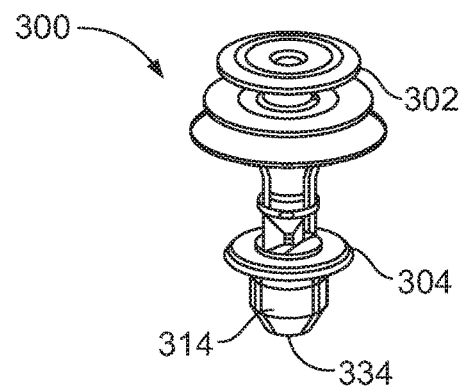
FIG. 11 illustrates a perspective top view of a fastener assembly, according to an embodiment of the present disclosure.
Figure 12:
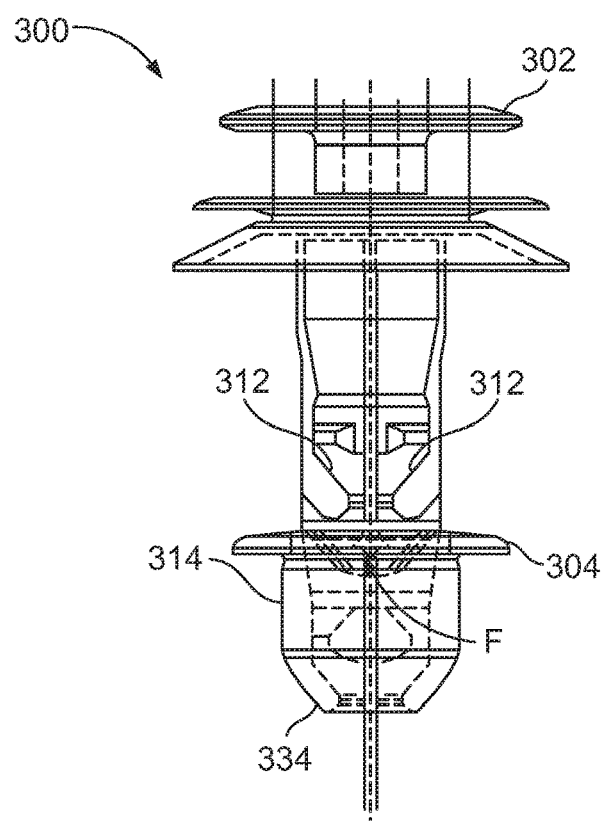
FIG. 12 illustrates a front view of a fastener assembly, according to an embodiment of the present disclosure.

FIG. 11 illustrates a perspective top view of a fastener assembly 300 according to an embodiment of the present disclosure. FIG. 12 illustrates a front view of a fastener assembly 300. The fastener assembly 300 may be the same as the fastener assembly 100 described with respect to FIGS. 1-10, except that the fastener assembly 300 may not include flex members. In short, the description with respect to FIGS. 1-10 applies the same to the fastener assembly 300, except for the description regarding the flex members.

The fastener assembly 300 may include a pin 302 and a grommet 304, as described above. The pin may include retaining ramps 312 (which may be the same as the retaining ramps 112) that are configured to inwardly draw distal ends 334 of grommet legs 314 into a retracted position, as described above.

Figure 13:
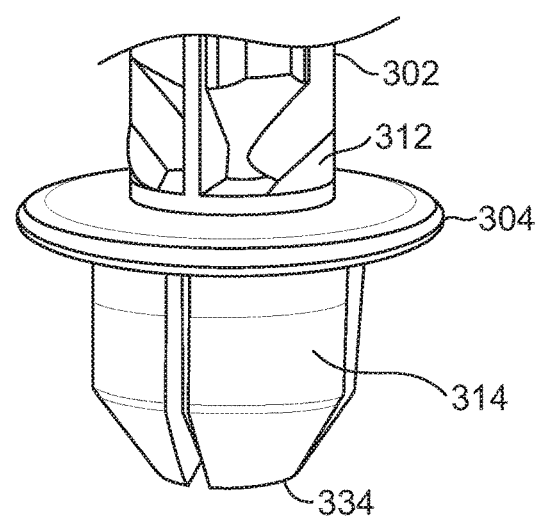
FIG. 13 illustrates a front perspective view of a pin positioned in a pre-installed state, according to an embodiment of the present disclosure.
Figure 14:
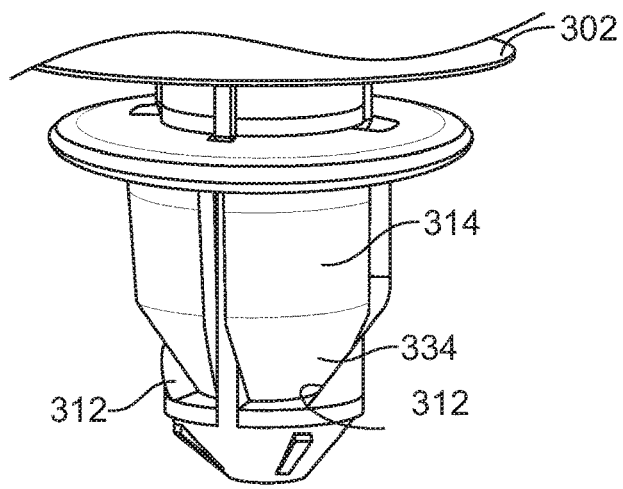
FIG. 14 illustrates a front perspective view of a grommet in a retracted state, according to an embodiment of the present disclosure.

FIG. 13 illustrates a front perspective view of the pin 302 positioned in a pre-installed state, according to an embodiment of the present disclosure. FIG. 14 illustrates a front perspective view of the grommet 304 in a retracted state, according to an embodiment of the present disclosure. Referring to FIGS. 13 and 14, the pin 302 includes the retaining ramps 312, which draw the legs 314 of the grommet 304 inwardly as the fastener assembly 300 is pulled out of a hole of a component. For example, as the fastener assembly 300 is pulled out of the hole, the pin 302 slides upwardly through the pin passage of the grommet 304. With continued urging, the distal ends 334 slide toward the recessed areas defined by the channels over the retaining ramps 312. The outer edges that define the hole act to squeeze the legs 114 inwardly so that the distal ends 334 of the legs 114 slide into the channels and are inwardly drawn by the retaining ramps 312. In this manner, the axial envelope of the legs 314 is reduced so that the grommet 304 may slide out of the hole. The retaining ramps 312 retain the grommet legs 314 in the retracted position (as described above) to maintain the reduced axial envelope so that the fastener assembly 300 may later be reinstalled into the hole or another hole without snagging on areas of the component surrounding the hole.

Referring to FIGS. 1-14, embodiments of the present disclosure provide fastener assemblies that are configured to be repeatedly installed and removed from components. The fastener assemblies may provide positive feedback during installation (such as by the flex members stabilizing the fastener assemblies with respect to a panel). The fastener assemblies may be used with various panels, having various sizes, hole tolerance ranges, and the like. Further, embodiments may be overmolded with an elastomeric material to be water-tight.

Embodiments of the present disclosure provide fastener assemblies that are configured to be removed from a component and re-installed into the component or another component, even after multiple removals. Because the retaining ramps retract or otherwise draw in the grommet legs during removal, the fastener assembly may be repeatedly used and inserted into a hole of a component with little to no increase in insertion force (as compared to the first time the fastener assembly is used). In at least one embodiment, the flex members provide stability by contacting interior edges of a panel that define a hole or opening, particularly when the hole or opening has a relatively large tolerance diameter size. The flex members and/or the retaining ramps may be configured to be in a line of draw, either to the core-cavity of the tool mold dies, or to slides that form such features, thereby not adding complexity to the forming tool. As noted, the fasteners assemblies may or may not include the flex members.

Embodiments of the present disclosure provide a fastener assembly that may be moved from a pre-installed state (in which the pin is not driven into the pin passage) into an expanded state in which the grommet legs are spread open to secure the fastener assembly to a component, such as a panel. During removal of the fastener assembly from the component, the fastener assembly may be moved into a retracted position, in which the grommet legs are inwardly drawn toward the pin so as to reduce an axial envelope of the grommet legs. For example, the pin may include ramped channels defined by retaining ramps into which portions of the grommet legs are retained in the retracted state. The retracted state reduces the axial envelope of the grommet legs and resists the grommet legs from permanently setting in an expanded position. In at least one embodiment, the fastener assembly may also include flex members that may be configured to stabilize the fastener assembly in the expanded state within a hole of a component.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. A fastener assembly configured to be secured to a component, the fastener assembly comprising:
   a pin including:
      a central shaft connected to a distal tip; and
      at least one retaining ramp extending into the central shaft through an outer surface of the central shaft; and
   a grommet including at least one leg, wherein the pin and the grommet are configured to be positioned in an expanded state in which the fastener assembly securely fastens to the component, and a retracted state in which the at least one leg is drawn toward the central shaft to reduce an axial envelope of the at least one leg, wherein the at least one retaining ramp is configured to inwardly draw and retain the at least one leg toward the central shaft in the retracted state.

2. The fastener assembly of claim 1, wherein at least a portion of the central shaft is driven through a pin passage of the grommet in the expanded state and the retracted state.

3. The fastener assembly of claim 2, wherein the pin and the grommet are positioned in a pre-installed state in which the central shaft is outside of the pin passage.

4. The fastener assembly of claim 1, wherein at least a portion of the at least one leg is trapped within the at least one retaining ramp in the retracted state.

5. The fastener assembly of claim 1, wherein the at least one retaining ramp comprises an angled surface that slopes from the outer surface of the central shaft toward a central longitudinal axis of the pin, wherein a channel is formed over the angled surface, and wherein the channel provides space for at least a portion of the at least one leg to be retained in the retracted state.

6. The fastener assembly of claim 1, wherein the pin comprises at least one flex member that is configured to stabilize the fastener assembly within a hole of the component in the expanded state.

7. The fastener assembly of claim 6, wherein the at least one flex member comprises a flexible root connected to the central shaft and a free end extending outwardly from the flexible stem at an angle.

8. The fastener assembly of claim 1, wherein the grommet comprises a flange surrounding a pin passage, wherein the at least one leg extends from the flange, and wherein the at least one leg comprises an inwardly-canted distal end.

9. A fastener assembly configured to be secured to a component, the fastener assembly comprising:
a pin including a central shaft connected to a distal tip, wherein a plurality of retaining ramps extend into the central shaft through an outer surface of the central shaft; and
a grommet including a plurality of legs, wherein the pin and the grommet are configured to be positioned in an expanded state in which the fastener assembly securely fastens to the component, and a retracted state in which the plurality of legs are drawn toward the central shaft to reduce an axial envelope of the plurality of legs, wherein the plurality of retaining ramps are configured to inwardly draw and retain the plurality of legs toward the central shaft in the retracted state, and wherein the plurality or retaining ramps trap the plurality of legs in the retracted state.

10. The fastener assembly of claim 9, wherein at least a portion of the central shaft is driven through a pin passage of the grommet in the expanded state and the retracted state.

11. The fastener assembly of claim 10, wherein the pin and the grommet are positioned in a pre-installed state in which the central shaft is outside of the pin passage.

12. The fastener assembly of claim 10, wherein each of the plurality of retaining ramps comprises an angled surface that slopes from the outer surface of the central shaft toward a central longitudinal axis of the pin, wherein a channel is formed over the angled surface, and wherein the channel provides space for at least a portion of one of the plurality of legs to be retained in the retracted state.

13. The fastener assembly of claim 10, wherein the pin comprises a plurality of flex members that are configured to stabilize the fastener assembly within a hole of the component in the expanded state.

14. The fastener assembly of claim 13, wherein each of the plurality of flex members comprises a flexible root connected to the central shaft and a free end extending outwardly from the flexible stem at an angle.

15. The fastener assembly of claim 10, wherein the grommet comprises a flange surrounding a pin passage, wherein the plurality of legs extend from the flange, and wherein each of the plurality of legs comprises an inwardly-canted distal end.

16. A fastener assembly configured to be secured to a component, the fastener assembly comprising:
a pin including a central shaft connected to a distal tip, wherein a plurality of retaining ramps extend into the central shaft through an outer surface of the central shaft, wherein each of the plurality of retaining ramps comprises an angled surface that slopes from the outer surface of the central shaft toward a central longitudinal axis of the pin, wherein a channel is formed over the angled surface; and
a grommet including a flange defining a pin passage, and a plurality of legs extending from the flange about the pin passage, wherein the pin and the grommet are configured to be positioned in:
(a) a pre-installed state in which the central shaft is outside of the pin passage,
(b) an expanded state in which the fastener assembly securely fastens to the component, and
(c) a retracted state in which the plurality of legs are drawn toward the central shaft to reduce an axial envelope of the plurality of legs,
wherein at least a portion of the central shaft is driven through a pin passage of the grommet in the expanded state and the retracted state, wherein the plurality of retaining ramps are configured to inwardly draw and retain the plurality of legs toward the central shaft in the retracted state, wherein the plurality or retaining ramps trap the plurality of legs in the retracted state, and wherein the channel provides space for at least a portion of one of the plurality of legs to be retained in the retracted state.

17. The fastener assembly of claim 16, wherein the pin comprises a plurality of flex members that are configured to stabilize the fastener assembly within a hole of the component in the expanded state.

18. The fastener assembly of claim 17, wherein each of the plurality of flex members comprises a flexible root connected to the central shaft and a free end extending outwardly from the flexible stem at an angle.

19. The fastener assembly of claim 16, wherein each of the plurality of legs comprises an inwardly-canted distal end.

* * * * *